United States Patent [19]
Klement

[11] Patent Number: 5,911,547
[45] Date of Patent: Jun. 15, 1999

[54] MOUNT FOR TOOL HOLDER ON SPINDLE SHAFT

[76] Inventor: Klaus-Dieter Klement, St.Mauri Strasse 1, D-52428 Jülich, Germany

[21] Appl. No.: 08/766,558

[22] Filed: Dec. 13, 1996

[30] Foreign Application Priority Data

Dec. 23, 1995 [DE] Germany .......................... 195 48 711

[51] Int. Cl.$^6$ ...................................................... B23C 1/00
[52] U.S. Cl. ..................... 409/233; 409/231; 408/239 A; 279/134; 279/146
[58] Field of Search .................................. 409/233, 231; 408/239 A, 228; 279/134, 135, 146, 4.12

[56] References Cited

U.S. PATENT DOCUMENTS

| | | | |
|---|---|---|---|
| 3,468,551 | 9/1969 | Sampson | 279/4.12 |
| 4,080,716 | 3/1978 | Vom Drop | 279/4.12 |
| 4,122,755 | 10/1978 | Johnson et al. | 408/238 |
| 4,978,262 | 12/1990 | Tjernstrom | 409/233 |
| 4,997,325 | 3/1991 | Heel et al. | 409/233 |
| 5,018,916 | 5/1991 | Bauch et al. | 409/233 |
| 5,193,954 | 3/1993 | Hunt . | |
| 5,391,027 | 2/1995 | Green | 409/233 |

FOREIGN PATENT DOCUMENTS

| | | |
|---|---|---|
| 0219594 | 4/1987 | European Pat. Off. . |
| 0387228 | 9/1990 | European Pat. Off. . |
| 0391262 | 10/1990 | European Pat. Off. . |
| 41 10 720 | 10/1992 | Germany . |
| 57-173409 | 10/1982 | Japan ........................ 279/134 |
| 1526922 | 12/1989 | Sweden ..................... 279/4.12 |

*Primary Examiner*—Daniel W. Howell
*Assistant Examiner*—Adesh Bhargava
*Attorney, Agent, or Firm*—Herbert Dubno; Andrew Wilford

[57] ABSTRACT

A spindle centered on an axis and formed with an axially forwardly open recess centered on the axis is secured to a tool holder formed with a tubular extension projecting axially rearward and fitted complementarily in the recess by a mount having an actuating rod axially displaceable in the spindle and having a head in the recess formed with an inner frustoconical surface directed rearward toward the collar and an outer annular surface generally perpendicular to the axis and also directed rearward toward the collar. A retaining element on the rod in the tubular extension has a plurality of segments forming a frustoconical inner front face directed forward toward the head, an outer annular face generally perpendicular to the axis and also directed forward toward the head, and a rear face directed axially rearward. A sleeve axially displaceable on the rod has a front face engageable with the rear face of the segments and a spring braced between the spindle and the sleeve biases the sleeve axially forward against the segments. The rod can be displaced axially rearward to press the segments rearward against the sleeve and cam the segments radially outward into an outer position with the front face of the segments bearing against the rear face of the head and the rear face of the segments bearing axially rearward against the collar.

7 Claims, 3 Drawing Sheets

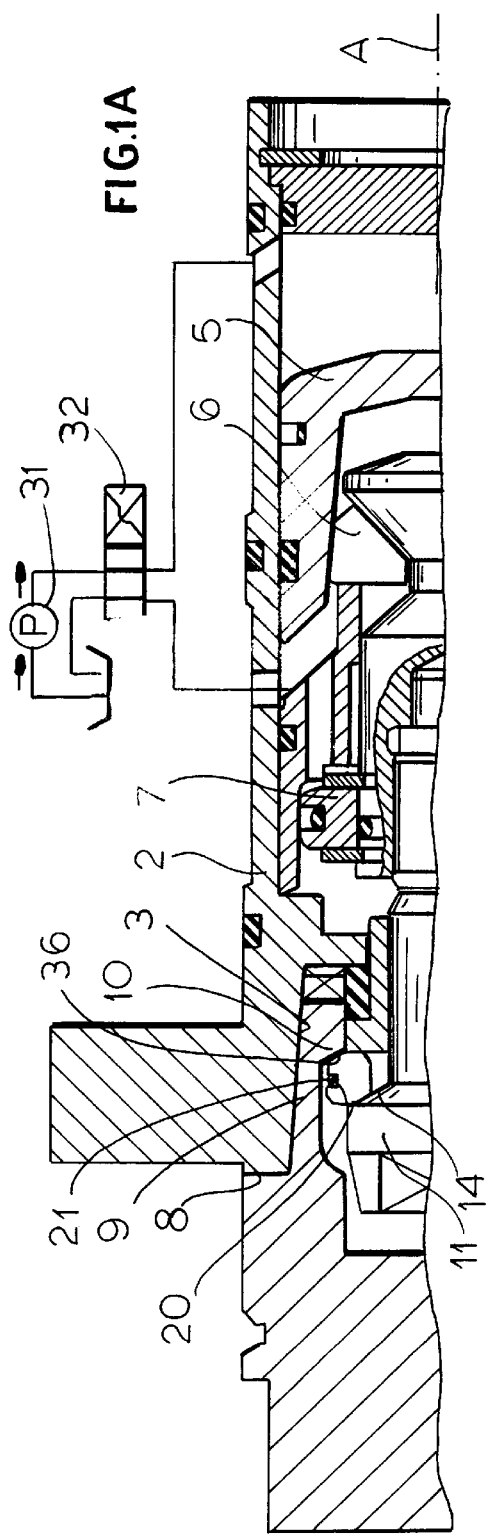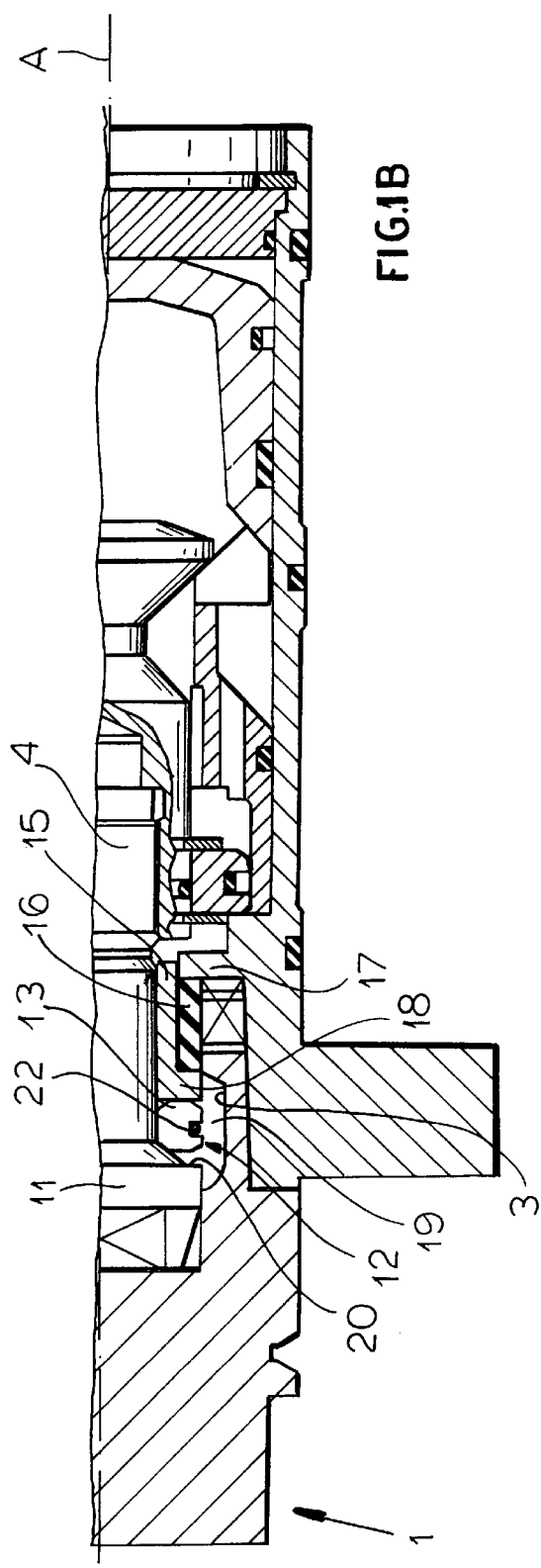
FIG.1A
FIG.1B

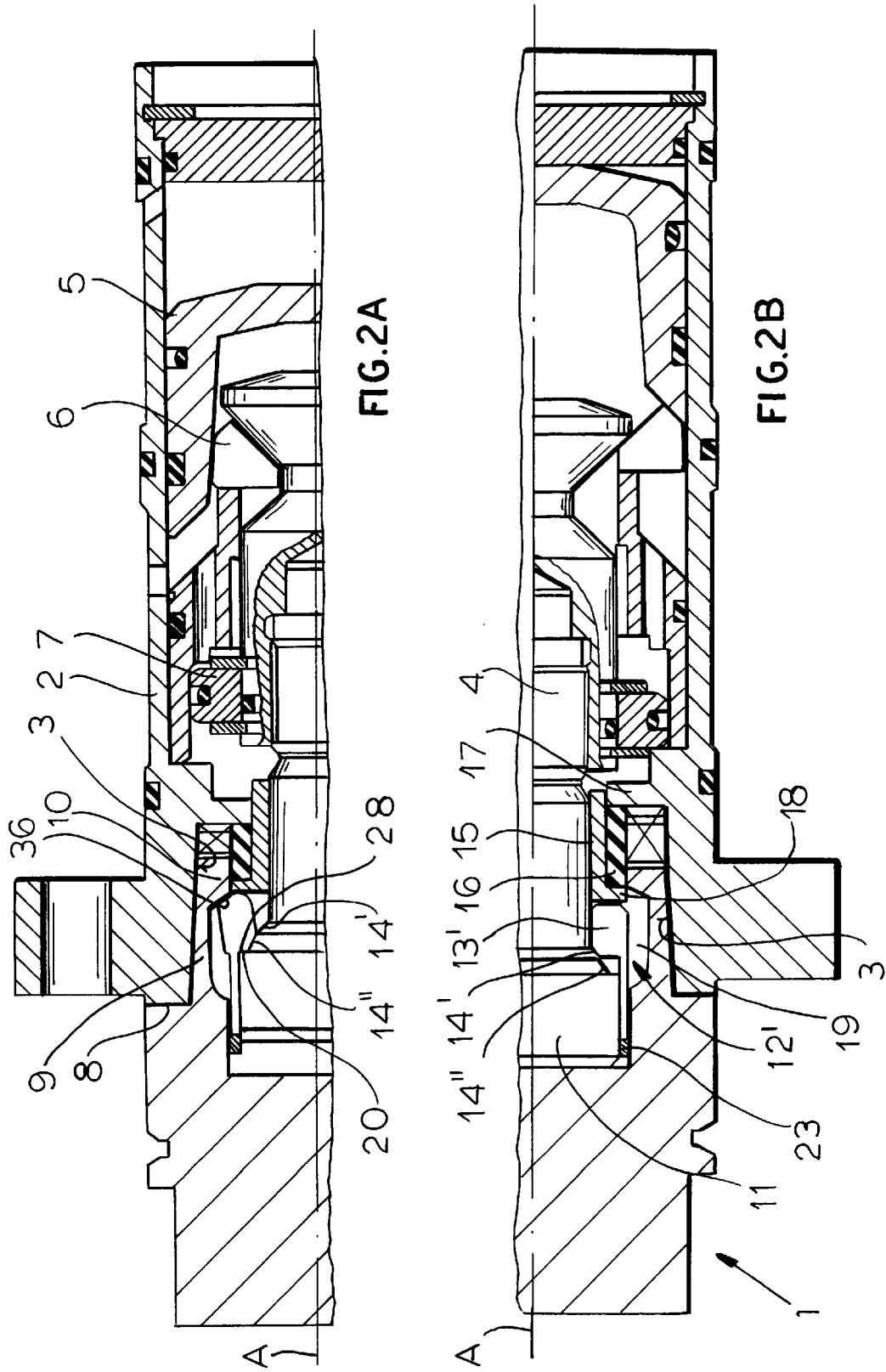

MOUNT FOR TOOL HOLDER ON SPINDLE SHAFT

FIELD OF THE INVENTION

The present invention relates to a system for mounting a tool on a spindle. More particularly this invention concerns a mount for releasably securing a tool holder on a spindle shaft.

BACKGROUND OF THE INVENTION

As described in German patent document 4,110,720 a driven part of a tool is fixed on a drive part of a drive spindle rotatable about an axis by a mount having a tubular extension projecting axially forward from one of the parts and formed centered on the axis with a radially inwardly projecting collar and a recess that is formed on the other part and that is complementarily engageable axially over the tubular extension. A retaining element in the tubular extension has a plurality of dogs deflectable radially between an outer blocking position axially behind the collar and an inner position radially inward of the collar. An actuating member in the retaining element in the tubular extension has a camming edge engageable outward with the dogs and interengaging formations between the actuating member and the other part inhibiting rotation of the actuating member relative to the other part while permitting axial displacement of the actuating member relative to the parts between a rear freeing position clear of the dogs with same in the respective inner position and a front position pressing the dogs outward into the respective outer blocking position.

A ring gear axially fixed in the other part coaxially surrounds the actuating member and is formed with an internal thread meshing with an external thread of the actuating member. A pinion rotatable in the other part about an axis extending radially of the spindle axis has teeth meshing like a right-angle drive with teeth of the ring gear. Thus rotation of the pinion in one direction rotates the ring gear in one direction and displaces the actuating member axially in one direction, and opposite rotation oppositely displaces all these parts. Hence the pinion can be used to axially displace the actuating member and thereby move the dogs between their outer position in which they hold the two parts together and their rear position.

This mechanism is fairly complex and adds excessively to the cost of the tool mount and spindle. In addition it creates an eccentric mass that must be compensated for carefully in order to avoid vibration at high rotation speeds. Unless all the parts are manufactured to very tight tolerances the system can jam or when clamped can exert nonequal force around the perimeter of the retaining element.

OBJECTS OF THE INVENTION

It is therefore an object of the present invention to provide an improved tool-holder mount.

Another object is the provision of such an improved tool-holder mount which overcomes the above-given disadvantages, that is which is very compact, axially symmetrical so that it creates no vibration at high speed, and constructed so that it clamps and releases smoothly and surely every time.

SUMMARY OF THE INVENTION

A drive spindle centered on an axis and formed with an axially forwardly open recess centered on the axis is secured to a tool holder formed with a tubular extension projecting axially rearward and fitted complementarily in the recess by a mount having an actuating rod axially displaceable in the spindle and having a head in the recess formed with an inner frustoconical surface directed rearward toward the collar and an outer annular surface generally perpendicular to the axis and also directed rearward toward the collar. A retaining element on the rod in the tubular extension has a plurality of segments forming a frustoconical inner front face directed forward toward the head, an outer annular face generally perpendicular to the axis and also directed forward toward the head, and a rear face directed axially rearward. A sleeve axially displaceable on the rod has a front face engageable with the rear face of the segments and a spring braced between the spindle and the sleeve biases the sleeve axially forward against the segments. The rod can be displaced axially rearward to press the segments rearward against the sleeve and cam the segments radially outward into an outer position with the front face of the segments bearing against the rear face of the head and the rear face of the segments bearing axially rearward against the collar.

This system is wholly axially symmetrical so that, even if it is rotated at very high speed, it will not create any vibration. In addition it can be made very short and the segments can be counted on to engage in all around contact between the rod head and the sleeve collar, ensuring that the two parts will be solidly locked together.

According to the invention the segments can be separate and unconnected with each other. A spring ring surrounding and engaging the blocks urges same radially inward. This is an extremely simple structure that can be counted on to have a long service life.

The retaining element according to the invention can also be unitarily formed as an annularly continuous ring centered on the axis and a plurality of fingers extending axially from the ring and each having an outer end forming a respective one of the segments. The retaining element has between the ring and the segments a thin-wall region formed with radially throughgoing and axially elongated cutouts defining the fingers. The ring is axially forward of the rod head and the fingers extend axially rearward from the ring past the rod head. In addition the retaining element is formed between the ring and the segments with a radially inwardly open groove fitting over the head and the retaining element is limitedly axially displaceable relative to the head. The ring is reinforced.

The frustoconical rear face of the head in accordance with this invention is formed by an inner portion of large apex angle and an outer portion of smaller apex angle and bordered by the annular rear face of the head.

BRIEF DESCRIPTION OF THE DRAWING

The above and other objects, features, and advantages will become more readily apparent from the following description, reference being made to the accompanying drawing in which:

FIGS. 1A and 1B are partly diagrammatic axial sections through a tool-holder mount according to the instant invention respectively in the holding and freeing positions;

FIGS. 2A and 2B are views like respective FIGS. 1A and 1B showing another mount according to the invention.

SPECIFIC DESCRIPTION

Figure 1C:
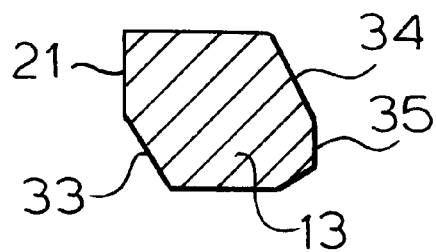
FIG. 1C is a large-scale view of a detail of FIG. 1A.

As seen in FIGS. 1A and 1B a tool holder 1 centered on an axis A is formed with a tubular extension 9 that fits in a frustoconically flared hole 3 of a spindle 2 that is centered on and rotatable about the axis A with the spindle 2 bearing directly against an annular end face 8 of the holder 1. Normally the holder 1 is fixed, that is does not rotate about the axis A. The spindle 2 is basically tubular and is provided internally with an actuating bolt or rod 4 having a head 11 inside the tubular extension 9 and an opposite end displaceable axially by segment wedges 6 actuated by a piston 5 that can be displaced by fluid pressure from a pump 31 through a reversing valve 32. In addition the rod 4 directly carries a release piston 7 so that, depending on the position of the valve 32, the rod 4 is urged axially either forward (to the left in the drawing) or rearward (to the right in the drawing).

The tubular extension 9 has an inwardly directed collar 10 with a forwardly directed frustoconical surface 36. A retaining element 12 comprised of a plurality of segmental blocks 13 urged radially inward by an annular spring 22 can move between an outer position (FIG. 1A) with the blocks 13 braced axially between the frustoconical surface 36 of the collar 10 and a rearwardly directed frustoconical surface 14 of the rod head 11, in which position it fixes the holder 1 on the spindle 2, and an inner position (FIG. 1B) clear of the collar 10, in which it allows the holder 1 to be pulled axially forward off the spindle 2.

A sleeve 15 is axially slidable on the rod 4 and has an end flange 18 bearing against the retaining element 12. An annular spring element 16 is braced axially forward against the flange 18 and axially backward against a web or shoulder 17 of the spindle 2 to continuously urge the element 12 axially forward in an annular space 19 defined between the flange 18 and the surface 14. In addition the head 11 is formed at the outer end of the frustoconical surface 14 with an annular surface 20 lying in a plane perpendicular to the axis A and engageable flatly with a parallel front-end surface 21 of the segment blocks 13.

Thus as better shown in FIG. 1C each segment 13 has a frustoconical front face 33 and, parallel thereto, a frustoconical outer face 34 that ride flatly on the complementary surfaces 14 and 36 of the head 1 and collar 10. In addition each segment 13 has a back face 35 parallel to the front face 21, that is perpendicular to the axis A, that is braced against the flange 18.

Thus with this arrangement when the system is in the FIG. 1A clamping position the segments 33 will be solidly engaged in flat surface contact fore and aft between the collar 10 and the head 11. As a result the two parts 1 and 2 will be held together with great force. In addition when the assembly is rotating at high speed, centrifugal force will maintain these segments 13 in their outer clamping position. When, however, the rod 4 is moved forward (to the left in FIGS. 1A and 1B), the spring 22 will move these segments 13 radially inward into the freeing position.

Figure 3:
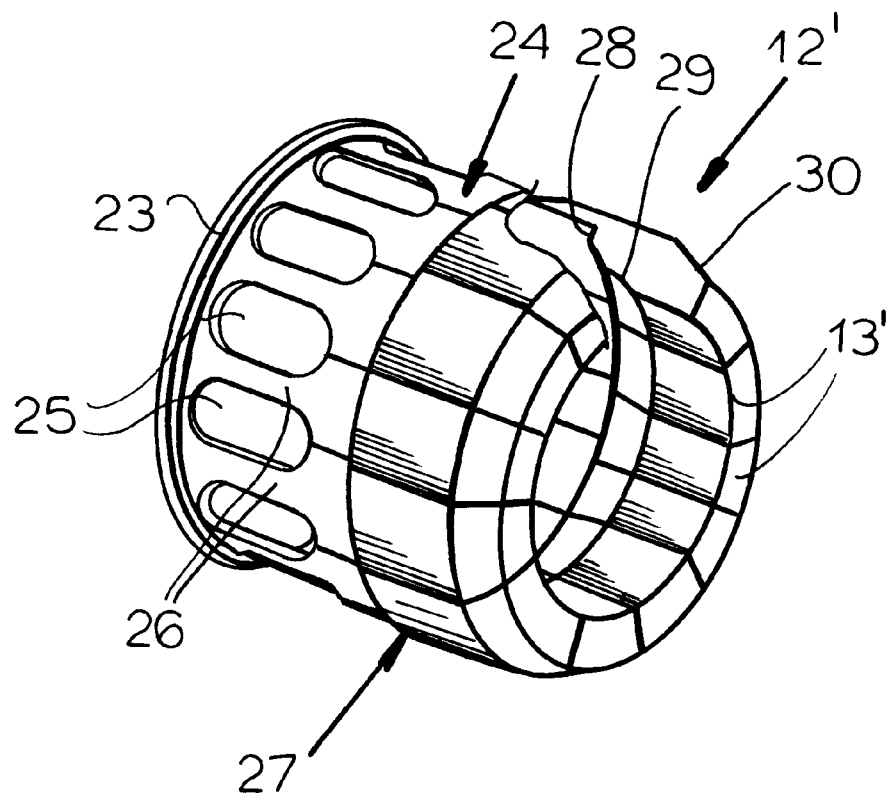
FIG. 3 is a perspective view of the retaining element of the mount of FIG. 2.

The system of FIGS. 2A, 2B, and 3 has a holder 1 that is rotated at high speed about the axis A. It has a retaining element 12' formed as an annularly continuous end ring 23 from which extends a thin-walled tubular section 24 subdivided by cutouts 25 into thin webs 26 each carrying a relatively thick outer section 27 forming one of the segment blocks 13' which together form an outer frustoconical surface 30. The thin-walled section 24 forms an indentation that fits over the cylindrical end of the head with an annular end face 28 defined by the segments 13' engaging against a perpendicular annular end face 28 of the head 11 and a frustoconical inner surface 29 riding on surfaces 14' and 14" of the head 11. The inner surface 14' extends at a steeper angle to the axis A than the surface 14" which lies flat against the surface 29 in the outer FIG. 2A position of the segments 13'.

I claim:

1. In combination:

a spindle centered on an axis and formed with an axially forwardly open recess centered on the axis;

a tool holder formed with a tubular collar projecting axially rearward and fitted complementarily in the recess;

an actuating rod axially displaceable in the spindle and having a head in the recess formed with an inner frustoconical surface directed rearward toward the collar and an outer annular surface generally perpendicular to the axis and also directed rearward toward the collar;

a retaining element on the rod in the tubular collar and having a plurality of segments that are separate and unconnected from each other and that form
a frustoconical inner front face directed forward toward the head,
an outer annular face generally perpendicular to the axis and also directed forward toward the head, and
a rear face directed axially rearward;

a spring ring surrounding and engaging the segments and urging same radially inward;

a sleeve axially displaceable on the rod and having a front face engageable with the rear face of the segments;

a spring braced between the spindle and the sleeve and biasing the sleeve axially forward against the segments; and means for axially displacing the rod rearward and thereby pressing the segments rearward against the sleeve and camming the segments radially outward into an outer position with the front face of the segments bearing against the rear face of the head and the rear face of the segments bearing axially rearward against the collar.

2. The combination defined in claim 1 wherein the retaining element is unitarily formed as an annularly continuous ring centered on the axis and a plurality of fingers extending axially from the ring and each having an outer end forming a respective one of the segments.

3. The combination defined in claim 2 wherein the retaining element has between the ring and the segments a thin-wall region formed with radially throughgoing and axially elongated cutouts defining the fingers.

4. In combination:

a spindle centered on an axis and formed with an axially forwardly open recess centered on the axis;

a tool holder formed with a tubular collar protecting axially rearward and fitted complementarily in the recess;

an actuating rod axially displaceable in the spindle and having a head in the recess formed with an inner frustoconical surface directed rearward toward the collar and an outer annular surface generally perpendicular to the axis and also directed rearward toward the collar;

a retaining element on the rod in the tubular collar formed unitarily as an annularly continuous ring centered on the axis axially forward of the rod head and a plurality of fingers extending axially from the ring and axially rearward from the ring past the rod head and each having an outer end forming a segment, the segments forming
a frustoconical inner front face directed forward toward the head,
an outer annular face generally perpendicular to the axis and also directed forward toward the head, and
a rear face directed axially rearward;

a sleeve axially displaceable on the rod and having a front face engageable with the rear face of the segments;

a spring braced between the spindle and the sleeve and biasing the sleeve axially forward against the segments; and means for axially displacing the rod rearward and thereby pressing the segments rearward against the sleeve and camming the segments radially outward into an outer position with the front face of the segments bearing against the rear face of the head and the rear face of the segments bearing axially rearward against the collar.

5. The combination defined in claim 4 wherein the retaining element is formed between the ring and the segments with a radially inwardly open groove fitting over the head and the retaining element is limitedly axially displaceable relative to the head.

6. In combination:

a spindle centered on an axis and formed with an axially forwardly open recess centered on the axis;

a tool holder formed with a tubular collar protecting axially rearward and fitted complementarily in the recess;

an actuating rod axially displaceable in the spindle and having a head in the recess formed with an inner frustoconical surface directed rearward toward the collar and an outer annular surface generally perpendicular to the axis and also directed rearward toward the collar, the frustoconical inner surface of the head being formed by an inner portion of large apex angle and an outer portion of smaller apex angle and bordered by the outer annular surface of the heads;

a retaining element on the rod in the tubular collar and having a plurality of segments forming a frustoconical inner front face directed forward toward the head, an outer annular face generally perpendicular to the axis and also directed forward toward the head, and a rear face directed axially rearward;

a sleeve axially displaceable on the rod and having a front face engageable with the rear face of the segments;

a spring braced between the spindle and the sleeve and biasing the sleeve axially forward against the segments; and means for axially displacing the rod rearward and thereby pressing the segments rearward against the sleeve and camming the segments radially outward into an outer position with the front face of the segments bearing against the rear face of the head and the rear face of the segments bearing axially rearward against the collar.

7. The combination defined in claim 6 wherein the segments are separate and unconnected with each other, the combination further comprising a spring ring surrounding and engaging the blocks and urging same radially inward.

* * * * *